United States Patent [19]

Baumberg

[11] Patent Number: 4,945,421
[45] Date of Patent: Jul. 31, 1990

[54] METHOD AND SYSTEM FOR REPRESENTING INFORMATION DATA WITH INTERROGATING ELEMENT DISPLACING FROM LIMIT INFORMATION FIELD BACK INTO THE INFORMATION FIELD

[76] Inventor: Iosif Baumberg, 69 Bay 29 St., Brooklyn, N.Y. 11214

[21] Appl. No.: 219,445

[22] Filed: Jul. 14, 1988

[51] Int. Cl.⁵ ............................................. H04N 3/30
[52] U.S. Cl. .................................... 358/217; 358/209
[58] Field of Search ........... 358/209, 212, 217, 213.26, 358/213.22, 216; 382/66

[56] References Cited

U.S. PATENT DOCUMENTS

| | | | |
|---|---|---|---|
| 2,904,629 | 9/1959 | Scherbatskoy | 358/217 |
| 3,002,125 | 9/1961 | Stevens et al. | 358/217 |
| 3,429,990 | 2/1969 | Hobrough | 358/217 |
| 4,011,401 | 3/1977 | Presti | 358/212 |
| 4,625,242 | 11/1986 | Baumberg | 358/209 |

*Primary Examiner*—Jin F. Ng
*Assistant Examiner*—Stephen Brinich
*Attorney, Agent, or Firm*—Ilya Zborovsky

[57] ABSTRACT

In representing information data, an interrogating element which moves in response to an impulse flow formed during the interrogation, displaces in a jump-like manner upon reaching an information field limit, back into the information field to a random point.

10 Claims, 2 Drawing Sheets

METHOD AND SYSTEM FOR REPRESENTING INFORMATION DATA WITH INTERROGATING ELEMENT DISPLACING FROM LIMIT INFORMATION FIELD BACK INTO THE INFORMATION FIELD

BACKGROUND OF THE INVENTION

The present invention relates to a method and system of representing information data, particularly those involving scanning of information data.

Methods and systems of the above mentioned type are widely known and used for example in television, radio-location, roentgenography, radioisotope analysis, storage tube of computer memory, etc. Scanning of the respective data is here performed for respective use.

In accordance with a method and system disclosed in my Pat. No. 4,625,242, an interrogating element interrogates information data and a flow of impulses is produced in correspondence with the interrogated data, and the interrogating element moves succesively in directions selected in response to commands formed in response to the impulses, from more than two directions with an equal probability. This provides for dependence between the tightness of scanning lines, the area of the picutured element, and the quantity of the information in the transmitted image, which leads to significant increase of resolving power. Flickering is eliminated. It is no longer necessary to return the interrogating element after each line to the beginning of the next line. The quality of images is improved.

In this method and system, however, the value of probability of interrogating the information from an element of image in any moment of time depends not only on the quantity of information of this element and distribution of the information over a whole field, but also on the distance of the interrogated element from the limited of the interrogated (scanned) field. During scanning of a field with uniformly distributed information, for example, a white field, not all points of elements of the field will be scannd with an equal average statistic frequency. With a decrease in a distance of an element from any limit of the field, the probability of scanning of this element will increase. The reason of this is that, impulses of the information impulse flow are added additionally with the impulses which are generated by the system of deviation of scanning elements from the limits of the field. Thereby the density of the lines near the field limit will increase, and a result the time of scanning near the field limits will be longer. Also the density of the lines of scanning depends on the value of the vidoesignal scanned from the respective portion of the image. Finally, it is not possible to regulate the average density of lines of scanning.

SUMMARY OF THE INVENTION

Accordingly, it is an object of the present invention to provide a method and a system of representing information data, which avoids the disadvantages of the prior art.

In keeping with these objects and with others which will become apparent hereinafter, one feature of the present invention resides, briefly stated, in that upon reaching by the interrogating element any limit of an information field which is being scanned, the interrogating element is displaced back into the information field in a jump-like manner to a random point.

When the method is performed and the system is designed in accordance with the present invention, the above disadvantages are eliminated.

In accordance with another feature of the present invention the main impulse flow which forms commands for moving the interrogating element in response to scanning of the information data is combined from a first impulse flow with a constant frequency of impulses which are randomly distributed in time, and a second impulse flow with impulses corresponding to a derivative of impulses of the information data.

In accordance with the present invention, in response to a signal of reaching by scanning elements of limit of the scanning field the following operations are performed in a sequence: the reproducing function of the scanning elements is turned off in the receiving device, for example by extinguishing of electron beam in a kinescope of the receiving device; one of points of the scanning point is selected in accordance with a random principle with an equal probability, and the scanning elements of the transmitting and receiving devices are transferred to this point; the function of the element which reproduces the image in the receiving device, for example electron beam in the kinescope of the receiving device is restored by turning off of a locking potential on the modulating unit of the kinescope.

These sequence of operations is performed separately for each coordinate of the scanning. When the scanning elements reaches a left or a right limit of the scanning field a new abscissa is selected while an ordnate remains unchanged, and when an upper or a lower limit is reached a new ordinate is selected while an abscissa remains unchanged.

When as described hereinabove, first and second impulse flows are combined, the second flow can be a result of first and subsequent derivatives of the value of input signal, in particular videosignal. As a result of action of the combined sequence the direction of movement of the scanning elements does not change with a probability of 0.25% and changes in accordance with a random principle for each of remaining three directions of scanning with the probability of 0.25%. The scanning element move along a vector-sum $\bar{z} = \bar{x} + \bar{y}$, wherein $\bar{x}$ is a vector of speed of movement of the scanning element along the axis of abscissa, $\bar{y}$ is a vector of speed of movement of scanning elements along the axis of ordinates.

For regulating an average frequency of lines of scanning, the impulse flow whose impulses are used as signals for forming the commands for selection of directions of movement of the scanning elements are recalculated with the coefficient $k \geq 1$.

The novel features of the invention are set forth in the appended claims. The invention itself will be best understood from the description of preferred embodiments which is accompanied by the following drawings.

DESCRIPTION OF A PREFERRED EMBODIMENT

Figure 1:
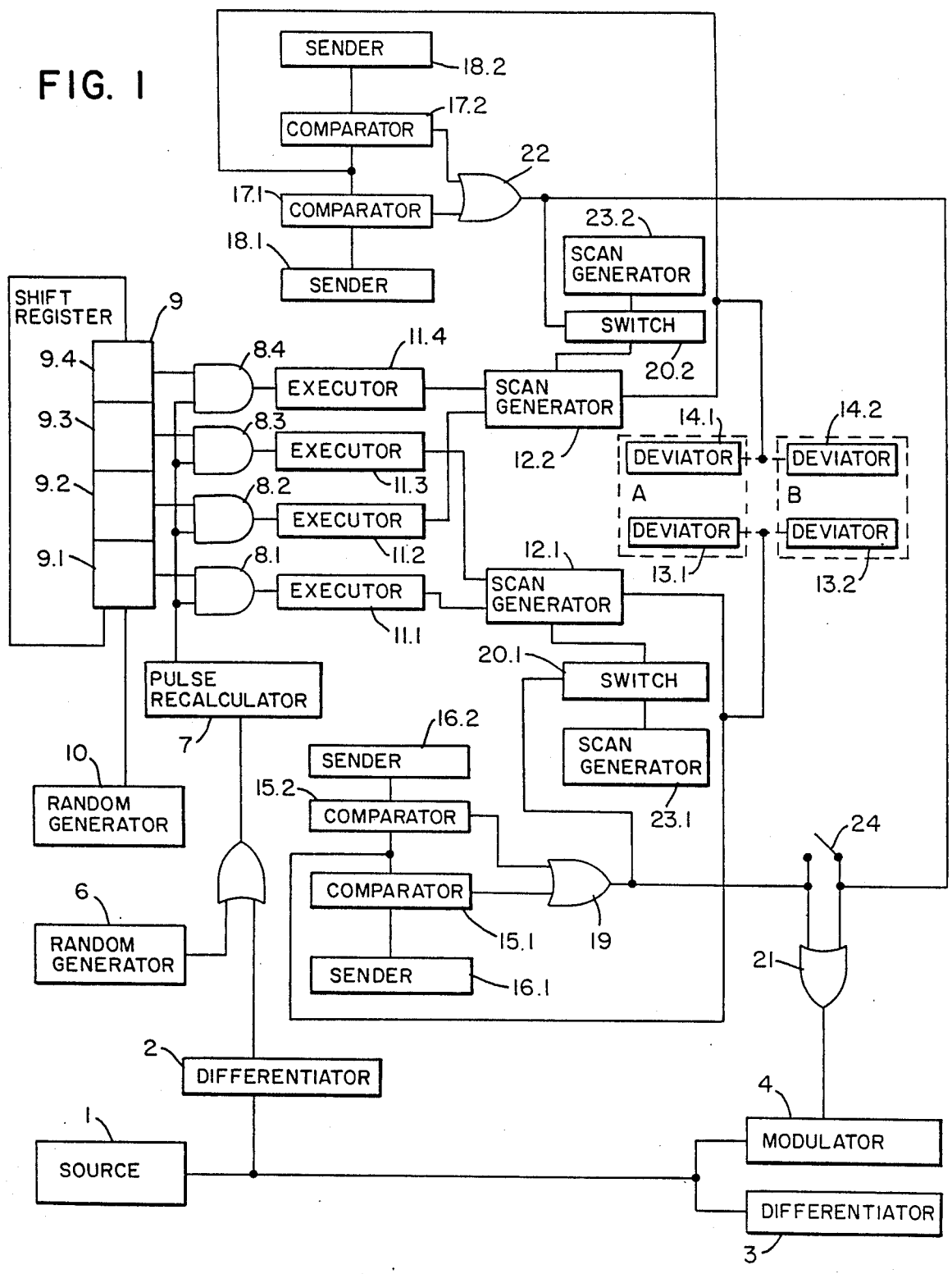
FIG. 1 is a view which schematically shows a system for representing information data, in accordance with the present invention.
Figure 2:
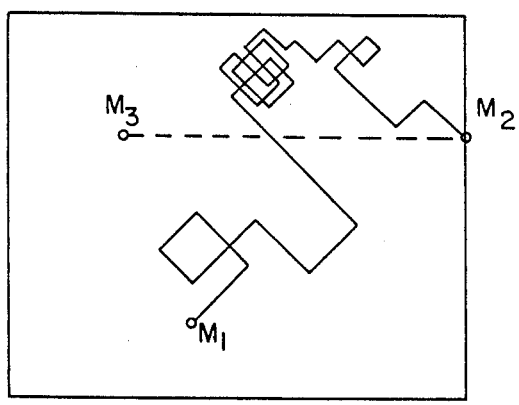
FIGS. 2-7 are views which shows various movements of an interrogating or scanning element over an information and field and especially near its limits, in accordance with the present invention.

Reference numeral 1 identifies a source of information, for example a source of a video signal. The output of the source of information is connected with inputs of a first differentiating unit 2 in a transmitting device, a second differentiating unit 3 and a modulating unit 4 in a receiving device. An output of a first generator of pulses randomly distributed in time 6 is connected with a first input of a logic elemment "OR" 5, while the output of the second differentiating unit 2 is connected with a second input of the logic element 5. The output of the logic element 5 is connected with an input of a pulse recalculating unit 7. The output of the unit 7 is connected with first inputs of all logic elements "AND" 8.1–8.4. For scanning of two-dimensional images in an orthogonal coordinate system, four elements "AND" are needed.

The second input of each logic element "AND " is connected with an output of a respective cell 9.1–9.4 of a shift register 9 with the "1" which is shifted by pulses supplied from the second generator of pulses randomly distributed in time 10. The pulses generated by the generators 6 and 10 can be distributed for example in accordance with Poisson's law.

The output of each logic element "AND" 8.1–8.4 is connected with an input of a respective executing unit 11.1–11.4. The output of one pair 11.1 and 11.3 of the executing units is connected with two inputs of a generator of scanning (sweeping) along an axis of absicssa 12.1. The output of a second pair 11.2 and 11.4 of the executing units is connected with two inputs of a generator of scanning (sweeping) along an axis of ordinate 12.2. The output of the generator 12.1 is connected with deviating units of a horizontal scannng (along the abscissa axis) 13.1 in the transmitting device A for example inconoscope, and 13.2 in the receiving device B for example kinescope. The output of the generator 12.1 is also connected with first inputs of two comparing elements 15.1 and 15.2. The output of the generator 12.2 is connected with the deviating systems of a vertical scanning (along the ordinate axis) 14.1 in the transmitting device A and 14.2 in the receiving device B. The output of the generator 12.2 is also connected with first inputs of two comparing elements 17.1 and 17.2.

The second input of the comparing element 15.1 is connected with a sensor of a constant value 16.1 equal to the abscissa of a left border of a rectangular field of an image $X_{min}$. The second input of the comparing element 15.2 is connected with a sender of a constant value 16.2 equal to the value of abscissa of the right border of the rectangular field of image $X_{max}$. The equations $X = X_{min}$ and $X = X_{max}$ correspond to the equations of straight lines which determine the left and right borders of the field to be scanned. The second input of the comparing element 17.1 is connected with a sender of constant value 18.1 equal to the value of ordinate of a lower limit of the rectangular scanning field $Y_{min}$. Finally, the second input of the comparing element 17.2 is connected with a sender of constant value of 18.2 equal to the value of ordinate of an upper limit of the rectangular scanning field $Y_{max}$. $Y = Y_{min}$ and $Y = Y_{max}$ are equations of straight lines located along the lower and upper borders of the field to be scanned.

The outputs of the comparing elements 15.1 and 15.2 are connected with inputs of a logic element "OR" 19. The output of the latter is connected with a controlling (giving) input of a first normally open switch 20.1 and a first input of a logic element "OR" 21. The outputs of the comparing elements 17.1 and 17.2 are connected with the inputs of a logic element "OR" 22. The output of the latter is connected with a controlling (giving) input of a second normally open controlled switch 20.2 and with a second input of the logic element "OR" 21. Through the first normally open switch 20.1, during the suppling a pulse to the controlling input of the latter, an auxiliar generator od scanning (sweeping) 23.1 is connected during the time of actin of the controlling pulse to the generator of scanning 12.1. Through the second controllable normally open switch 20.2, during supplying of a controllable pulse to the input of the latter, a second auxiliary generator od scanning 23.2 is connected during the time of action of the controlling pulse with the generator of scanning 12.2. The inputs of the logic element "OR" 21 are connected with two outputs of a switch 24.

The system in accordance with the present invention operates in the following manner:

The information which is being read by a source 1 (FIG. 1), for example inconoscope of a transmitting device, is supplied and an information pulse flow F(t) with F(t) equal to an average statistic frequency of pulses Fb as a function of time t, to the inputs of the differentiating unit 2 in the transmitting device, and the differentiating unit 3 and the modulating unit 4 in the receiving device. From the output of the differentiating unit 2 an absolute value of a derivative of the input signal [F'(t)] in a discrete form is supplied to the first input of the logic element "OR" 5. The second input of the latter receives from the generator 6 a permanent flow of pulses which are randomly distributed in time and have a constant average statistic frequency of pulses $F_1$, which are distributed for example in accordance with a Poisson law. The pulse flows from the unit 2 [F'(t)] and from the generator of pulses 6 $F_1$ are superimposed in the logic element "OR" 5 and supplied at the output of the latter as a resulting flow $F_3(F_1[F'(t)])$. The latter flow contains a sum of the component flows $F_1$ and [F'(t)] without the pulses which have coincided in time. The resulting flow $F_3$ passes through the recalculating unit 7 with the recalculating coefficient $k \geq 1$ and is supplied simultaneously to all first inputs of the logic elements 8.1–8.4. The value "1" recorded in one of the cells 9.1–9.4 of the cycled shift register 9 moves under the action of the pulses which are received by its input from the output of the second generator of randomly coinciding pulses 10, which act as a displacing pulse flow. As a result, at the outputs of all elements "AND" 8.1–8.4 the flows are formed which pulses which are randomly distributed in time and have equal frequencies of pulses. A variable component of an average statistic frequency of pulses at the output of any of the logic elements 8.1–8.4 is a value which is a function of an absolute value of a derivative of pulse flow of information F(t) which is being read from the source 1 of the receiving device. Under the action of the pulse supplied from the output of the logic element 8.1, the executing unit 11.1 turns the scanning elements of the transmitting and receiving devices into a mode of monotonous reduction in time of the abscissa ($X^{31}$) in the latter. Under the action of the pulse which is supplied from the output of the logic element 8.3, the executing device 11.3 turns the scanning elements of the transmitting and receiving devices into a mode of monotonous increase in time of the abscissa ($X^{30}$) of the latter. Under the action of the pulse supplied from the logic element 8.2 the executing unit 11.2 turns the scanning elements into a mode of monotonous reduction of the ordinate ($Y^{31}$). Under the action of the pulse supplied from the logic element 8.4 the executing unit 11.4 turns scanning elements into a mode of monotonous increase of the ordinate ($Y^{30}$).

During a transfer from one mode of scanning to an opposite one along an axis of abscissas, the mode of scanning along the axis of ordinates is not changed, and vice versa. With the aid of the comparing element 15.1 a value of actual abscissa of the scanning elements x which is supplied from the generator 12.1 is continuously compared with a given constant value $X_{min}$ which is supplied from the sender 16.1. Similarly the element 15.2 compares the constant value $X_{max}$ supplied from the sender 16.2 with a variable value of abscissa X of the scanning elements supplied from the generator 12.1. When a signal of equal values is produced, the output of the comparing element 15.2 sends a pulse to a second input of the logic element "OR" 19. The pulse from the output of any comparing element 15.1 and 15.2, through the logic element "OR" 19 is supplied to the first input of the logic element "OR" 21 and to the controlling input of the first normally open switch 20.1. A signal from the output of the latter is supplied to the modulating unit 4 formed for example as a modulating electrode of the kinescope, turns off the action of the reproducing unit for example locks the electron beam of the kinescope of the receiving device, and simultaneously the pulse from the output of the logic element "OR" 19 which is supplied to the controlling input of the normally open switch 20.1 turns the latter during the time of action of the controlling pulse into the closed condition. In the closed condition the switch 20.1 connects the output of the auxiliary generator 23.1 with the output of the generator of horizontal scanning 12.1. As a result of this connection the output value of the generator 23.1 is transferred to the generator 12.1. After the end of the action of the pulse which is supplied from the output of the logic element 19 the switch 20.1 returns to an open condition, and the scanning of the generator 12.1 continues from a new starting value $X_i(t_i)$, wherein $X_{min} \leq X_i(t_i) \leq X_{max}$ and $i=1, 2, 3, \ldots$ Since the moment of time $t_i$ of the supply of the pulse from the output of the logic element 19 is random, the value $X_i(t_i)$ is random value from the interval $X_{min}-X_{max}$.

When a value of ordinate Y of scanning elements becomes equal to one of the values $Y_{min}$ and $Y_{max}$ a pulse is produced at the output of the comparing element 17.1 or 17.2. Through the logic elements "OR" 22 and 21 it is supplied to the input of the modulating unit 4. The pulse from the comparing elements 17.7 and 17.2 is supplied through the logic element "OR" 22 to the controlling input of the second normally open switch 20.2 and turns the latter during the time of action of the pulse, into the closed condition. In the closed condition the switch 20.2 connects the input of the axiliary generator 23.2 with the input of the generator of vertical scanning 12.2. As a result of this connection the output value of the generator 23.2 is supplied to the generator 12.2 after the end of the acruion of the pulse supplied from the logic element 22 the switch 20.2 returns to its open condition, and the scanning of the generator 12.2 continues from a new initial value $Y_r(t_r)$, wherein $Y_{min} \leq Y_r(t_r) \leq Y_{max}$ and $r=1, 2, 5, \ldots$ Since the time of moment $t_r$ of the supply of the pulse from the output of the logic element "OR" 22 is random, the value $Y_r(t_r)$ is random value from the interval $Y_{min}-Y_{max}$. Simultaneously with the end of action of the pulses from the outputs of the logic elements 19 and 22, an input or closing signal is supplied from the modulating unit 4, and the function of the turning (scanning) element in the receiving device for reproducing of the received image is restored.

Therefore, in the first mode of operation of the system, with the open switch 24, when the scanning element reaches the left or right limit of the scanning field, the abscissa of the scanning element jumps from $X_{min}$ or $X_{max}$ so as to obtain as a result of the jump a random value $X_i(t_i)$. All values $X_i(t_i)$ are distributed in the interval $X_{min}-X_{max}$ with equal probability. The changes in the abscissa of the scanning elements do not lead to changes in ordinates of the latter. Alalgous process takes place when the scanning elements reach the upper and lower limits of the scanning field. The ordinate of the scannng elements jumps from the values $Y_{min}$ and $Y_{max}$ to obtain a random value $Y_r(t_r)$. All values $Y_r(t_r)$ are distributed with an equal probability in the interval $Y_{min}-Y_{max}$.

Figure 3:
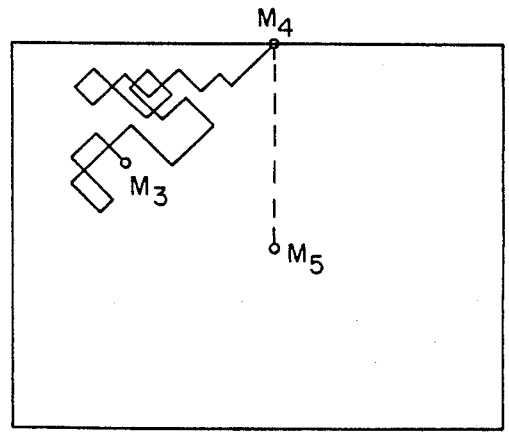

FIGS. 2–5 schematically show projections of movements of the scanning elements along a scanning field during the operation of the system in the first mode, with the open switch 24. FIG. 1 shows a trajectory of movement of the scanning elements from an initial point $M_1(X_1; Y_1)$. The movement reaches the right limit of the scanning field in the point $M_2(X_{max}, Y_2)$. Since the abscissa of the scanning element becomes equal to the value $X_{max}31$ the value supplied from the sender 16.2 to the input of the comparing element 15.2, the output of the latter produces the pulse which is supplied simultaneously to the controlling input of the normally open switch 20.1 and the modulating unit 4. Under the action of the pulse at the modulating unit, the beam in the receiving device is extinguished (locked). The random value which is during the action of the pulse equals to $X_3$ is supplied from the axiliary generator 23.1 to the generator of the horizontal scanning 12.1, and the scanning elements move by a jump to the point $M_3(X_3, Y_2)$. After the end of the action of the pulse which is supplied to the comparing element 15.2, the beam in the receiving device is unlocked, and the scanning elements continue scanning from the point $M_3(X_3, Y_2)$. When the scanning elements reach the point $M_4(X_4, Y_{max})$ with the limit ordinate $Y_{max}$ the comparing element 17.2 supplies the pulse, and as a result of it the modulating unit locks the reproducing beam in the kinescope, while the auxiliary generator 23.2 supplies to the generator of the horizontal scanning the value of $Y_5$. Then as a result of this, the scanning elements move in a jump to the point $M_5(X_4, Y_5)$ as shown in FIG. 3.

Figure 4:
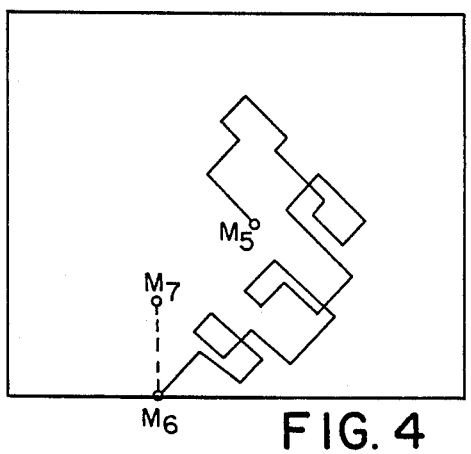
Figure 5:
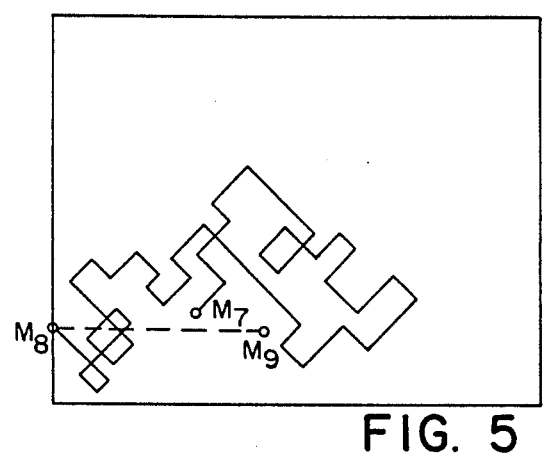

FIG. 4 shows a trajectory of further movement of the scanning elements, starting from the point $M_5(X_4, Y_5)$ to the point $M_6(X_6, Y_{min})$. Since the point $M_6$ reaches the limit ordinate $Y_{min}$, the pulse is produced at the output of the comparing element 17.1, which turns the scanning elements to the point $M_7$ $(X_6, Y_7)$. FIG. 5 shows the trajectory of movement of the scanning elements from the point $M_7(X_6, Y_7)$ to the point $M_8(X_{min}, Y_8)$. When the scanning elements reaches the point $M_8$, the pulse is supplied from the comparing element 15.1, and as a result of this the scanning elements move by a jump to the point $M_9$ $(X_9, Y_8)$. The values of abscissas and ordinates of the points $M_3$, $M_4$·$M_5$, , $M_6$, $M_7$, $M_8$, and $M_9$—are distributed randomly in the intervals $X_{min}-X_{max}$ and $Y_{min}-Y_{max}$.

Figure 6:
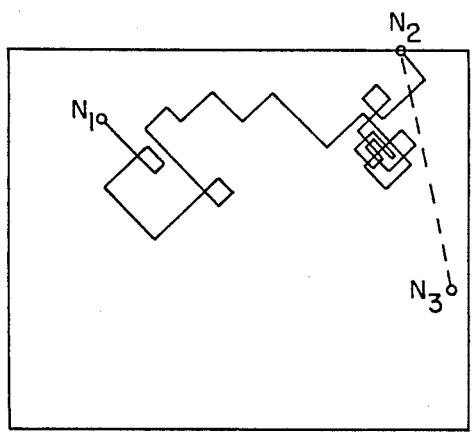
Figure 7:
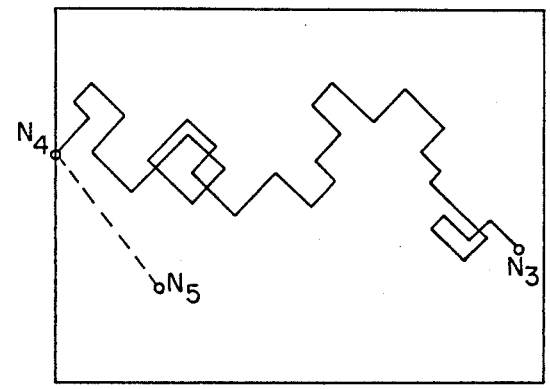

FIGS. 6 and 7 schematically show the trajectories of movement of the scanning elements in a second mode of operation, when the switch 24 is closed. In this mode the appearance of pulses at the outputs of all comparing elements 15.1, 15.2, 17.1, 17.2 leads to the supply of the pulse simultaneously to the input of the modulating electrode 4 and the controlling inputs of the normally open switches 20.1 and 20.2. As a result of this when the scanning elements reach a point whose one ordinate is $X_{min}$, $X_{max}$, $X_{min}$, $Y_{max}$ they are transferred by a jump to a point in which both coordinates are selected randomly in the above intervals.

FIG. 6 shows the trajectory of movement of the scanning elements from an initial point $N_1$. When they reach in the process of movement the point $N_2(X_2, Y_{max})$, the scanning organs are moved to the point $N_3$ with randomly selected coordinates are selected randomly, namely $N_3(X_p, Y_p)$. FIG. 7 shows the trajectory of movement of scanning elements from the point $N_3$ to the point $N_4(X_{min}, Y_4)$ in which they move by a jump to the point $N_5$. The coordinates of the points $N_1$, $N_2$, $N_3$, $N_4$, $N_5$ are independent from one another and are random values within the above intervals.

In accordance with the present invention, the resulting pulse flow which serves as a commutating pulse flow for selection of the pulses which are generated by the unit 10 and used as commands for selection of the direction of movement of the scanning elements of the transmitting and receiving devices, is formed as a pulse flow which combines the pulses of the constant pulse flow with a constant average statistic frequency and pulses which are randomly distributed in time, with a flow of pulses whose frequency is a monotonously increasing function of an absolute value of a derivative $[F'(t)]$ of the input information $F(t)$, for example videosignal supplied from the unit 1.

With an increasing in the density of a gradient of brightnesses of the portion of a transmitting image, correspondingly the absolute value of the derivative of the signal supplied from this portion of the image is increased, and correspondingly the frequency of the pulses of the resulting pulse flow increases. The leads to a decreases of time intervals between the pulses, and as a result to the increase of the density of lines of scanning along both axes of scanning and finally to the increase in quality of transmission and receipt of the information as well as to increases of sharpness of the image in the portions in which the density of the gradients of brightnesses is higher.

Also, in accordance with the invention, for obtaining a uniform scanning filed, when the scanning elements reach any limit of the field they are moved to a point with random coordinates with an equal probability. It should be mentioned that since the generators 12.1 and 12.2 are connected both with the deviating systems 13.1, 13.2 in the transmitting device A and the deviating systems 14.1, 14.2 in the receiving device B, the interrogating element in the transmitting device and the reproducing element in the receiving device move in synchronism with one another.

The invention is not limited to the details shown since various modifications and structural changes are possible without departing from the spirit of the present invention.

What is desired to be protected by Letters Patent is set forth in particular in the appended claims.

I claim:

1. A method of representing information data, comprising the steps of
scanning information data, interrogating information data by a movable interrogating element, forming a main flow of impulses coresponding to the data which have been interrogated by said interrogating element, moving said interrogating element successively in directions selected in response to said impulses from more that two directions with an equal probability, and upon reaching by said interrogating element a limit of an information field displacing said interrogating element back into the information field in a jump-like manner to random point.

2. A method as defined in claim 1, wherein said displacing to a random point includes displacing said interrogating element upon reaching the limit, in a direction which is opposite to a direction in which said interrogating element was moving prior to the reaching of the limit.

3. A method as defined in claim 1, wherein said displacing includes displacing said interrogating element upon reaching the limit, in a random direction.

4. A method as defined in claim 1. and further comprising the step of moving a reproducing element in synchronism with said interrogating element.

5. A method as defined in claim 1, wherein said forming includes producing a first impulse flow with a constant statistic frequency of impulses which are randomly distributed in time, producing a second impulse flow with impulse corresponding to a derivative of impulses of the information data, and combining said first and second impulse flows so as to form said main flow of impulses.

6. A system for representing information data, comprising
a scanning device for scanning information data and including means for interrogating the information data and formed as a movable interrogating element, means for forming a main flow of impulses corresponding to the information data which have been interrogated by said interrogating element, means forming commands in response to the impulses for moving said interrogating element successively in directions selected from more than two directions with equal probability, means for receiving said commands and moving said interrogating element in correspondence with the latter, and means for displacing said interrogating element upon reaching a limit of an information field, back into the information field in a jump-like manner to a random point.

7. A system as defined in claim 6, wherein said displacing means is formed as means which displaces said interrogating element to a random point upon reaching the limit, in a direction which is opposite to a direction in which said interrogating element was moving prior to the reaching of the limit.

8. A system as defined in claim 6, wherein said displacing means is formed as means which displaces said interrogating element upon reaching the limit, in a random direction.

9. A system as defined in claim 6, and further comprising a reproducing element arranged to move in synchronism with said interrogating element.

10. A system as defined in claim 6, wherein said forming means includes first means for producing a first impulse flow with a constant statistic frequency of impulses randomly distributed in time and second means for producing a second impulse flow with an impulse frequency corresponding to a derivative of impulses of the information data, such that said first and second impulse flows are combined to form said main flow of impulses.

* * * * *